United States Patent [19]

Tilman

[11] 4,355,494

[45] Oct. 26, 1982

[54] RECLOSABLE BAGS, APPARATUS AND METHOD

[75] Inventor: Paul A. Tilman, Canvey Island, England

[73] Assignee: Minigrip, Inc., Orangeburg, N.Y.

[21] Appl. No.: 173,755

[22] Filed: Jul. 30, 1980

[30] Foreign Application Priority Data

Aug. 6, 1979 [GB] United Kingdom ................ 7927390

[51] Int. Cl.³ .......................... B65B 61/00; B65B 9/12
[52] U.S. Cl. ...................................... 53/416; 53/451;
53/128; 53/551; 493/194; 493/214
[58] Field of Search ................ 53/128, 410, 419, 551,
53/416, 552, 139.3, 140, 450, 451; 493/214, 194,
927, 193, 198, 248, 264, 302; 229/62, 62.5;
150/3

[56] References Cited

U.S. PATENT DOCUMENTS

| 3,198,228 | 8/1965 | Naito | 229/62 X |
| 3,219,084 | 11/1923 | Ausnit et al. | 150/3 |
| 3,381,592 | 5/1968 | Ravel | 493/214 X |
| 3,473,589 | 10/1969 | Gotz | 150/3 |
| 3,807,118 | 4/1974 | Pike | 53/14 |
| 3,815,317 | 6/1974 | Toss | 53/28 |
| 3,948,705 | 4/1976 | Ausnit | 156/73.4 |
| 4,101,355 | 7/1978 | Ausnit | 156/66 |

FOREIGN PATENT DOCUMENTS 1546433 5/1979 United Kingdom .

Primary Examiner—Horace M. Culver
Attorney, Agent, or Firm—Hill, Van Santen, Steadman, Chiara & Simpson

[57] ABSTRACT

A method and apparatus are provided by which bag forming material is obtained by feeding sheet material (2) together with male and female closure elements (5, 6) to a nip between guide roller (3) and pressure rollers (9, 10) at which adhesive is applied from nozzles (11, 12). The resulting material assembly is fed by drive roller means (14, 15) to an accumulator (16) on a continuous basis and then intermittently over a forming shoulder (21) into a tubular form (22) while maintaining the closure elements (5, 6) at a predetermined distance apart before the forming shoulder (21) by means such as grooves (19) in guide roller (18) and locating the closure elements (5, 6) in predetermined positions facing each other downstream of the shaping shoulder by suitable means (23) which may include rotatable guide elements. The tubular form (22) is drawn through the apparatus by transverse reciprocating sealing bars (26) and a pilfer proof closure can be provided by vertical sealing bars (25).

19 Claims, 6 Drawing Figures

RECLOSABLE BAGS, APPARATUS AND METHOD

BACKGROUND OF THE INVENTION

This invention relates to reclosable bags and to methods and apparatus for the manufacture of such bags, and intermediate products for subsequent forming into such bags, and to articles in the form of such bags containing a product material.

Reclosable bags having male and female profiled cooperating reclosable elements along the opening to the bag have been known for some considerable time. The principal method of making such a bag has been to extrude a tube which has the reclosable elements integral therewith and to form the bags by flattening the tube to close the reclosable elements together and to part off individual bags by sealing the flattened tube transversely, the portion of the tube lying between the reclosable elements being slit to provide the opening to the bag. This method of manufacture has the disadvantage that the reclosable elements must be of the same material as the bag forming sheet material or substrate. Various methods have therefore been devised for applying separately extruded reclosable elements to an extruded tube of substrate. In more recent times processes have been developed which involve the application of reclosable elements to a flat sheet of the substrate. These latter methods have the advantage that the substrate material can be a material having properties suitable to the bag itself while the reclosable elements can be made of a material having suitable properties for the reclosable elements. In particular, the substrate can be made of a laminated material. However, it is necessary to transform the flat sheet of material into tubular form in order to make the bags.

The vast majority of reclosable bags are intended as packaging materials. In other words, the bags are intended to be filled with a product for subsequent resale as an article in the form of the bag and the product material therein. Clearly where the basic tubular product is formed into individual bags it is possible to fill the individual bags by hand. This is however a slow and expensive method. A process has been devised by which the intermediate tubular product is slit between the reclosable elements and the product is introduced between the reclosable elements above a first transverse seal in the tubular formed intermediate product, the reclosable elements are closed once again and a further transverse seal is provided so that the article as defined above is formed. However this transverse filling of the tubular form intermediate product is a relatively slow process.

A common method of making articles in the form of plastics bags containing product materials is by use of a vertical forming filling and sealing apparatus. Such apparatus takes a flat sheet of plastics material which it passes upwards over a shaping shoulder and then downwards in a tubular form while sealing the adjacent longitudinal edges of the tubular form. A product material is introduced through the access opening at the top of the tubular form and the articles are made by periodic transverse sealing of the tubular formed plastics material. Such a process is relatively fast and a proposal has been made (British Pat. No. 1394335 U.S. Pat. No. 3,815,317) by which a tubular form of a reclosable bag intermediate product is first opened up into a flat sheet and then passed over a shaping head in the way just described for sheet material not incorporating reclosable elements.

The object of various aspects of the present invention is to improve the production of reclosable bags and articles in the form of reclosable bags with a product material therein and, in particular, of such bags and articles in which the bag material is in the form of a laminated substrate with reclosable elements of a separate material secured thereto.

SUMMARY OF THE INVENTION

In accordance with one aspect of the present invention there is provided a method of making a tubular plastics intermediate product for subsequent forming into bags reclosable along one pocket edge, the method comprising providing a length of a bag forming sheet material in a substantially flat form and with laterally spaced cooperative reclosable elements extending parallel to the free longitudinal edges of the sheet material, passing said sheet material towards a shaping shoulder while constraining said reclosable elements to follow respective paths which are a fixed distance apart at a given spacing from said shoulder, forming said sheet material about the shoulder into a substantially tubular form and guiding said reclosable elements to predetermined positions facing each other, and causing said reclosable elements to enter into cooperative engagement.

In a further aspect of the present invention said bag forming material is provided by feeding a length of substrate sheet material in a substantially flat condition and simultaneously feeding respective lengths of cooperable male and female reclosable elements onto the sheet material adjacent the longitudinal edges thereof, and applying an adhesive to one or both of the contact surfaces of a respective length of reclosable element and the length of sheet material before the mutual contact thereof.

Preferably said tubular form is moved intermittently and the length of substrate material and lengths of reclosable elements are fed substantially continuously and bag forming material is stored in an accumulator prior to said shaping shoulder.

In another preferred aspect of the present invention the longitudinal edges of the bag forming material are sealed together after the formation of said tubular form whereby to form a pilfer proof closure.

In accordance with an aspect of the invention relating to a method of forming reclosable bags of plastics material the invention provides for the formation of a tubular intermediate product in a manner as defined in one of the preceding paragraphs and transversely sealing the tubular form to provide individual bags.

In accordance with an aspect of the invention relating to the making of articles in the form of bags reclosable along one pocket edge and containing product material, the invention comprises forming an intermediate tubular product in accordance with one of the methods defined above by passing the sheet material upwardly to the shaping shoulder and then downwardly therefrom in the tubular form so as to provide an upwardly facing access opening to the interior of said tubular form, introducing a product material into said access opening, and periodically sealing the tubular form transversely to said downward movement to form said articles.

In accordance with a further aspect of the present invention there is provided apparatus for the manufacture of a tubular intermediate plastics product for subsequent forming into bags reclosable along one pocket edge, the apparatus comprising a shaping shoulder for forming flat sheet material into tubular form, first guide means for flat sheet material arranged upstream of said shoulder and having guide elements for holding reclosable profile elements extending longitudinally of said sheet material a fixed distance apart, and second guide means arranged downstream of and for positioning in fixed relationship to said forming shoulder, said second guide means including guide elements for locating said reclosable profile elements in respective opposing positions for ready interengagement.

Preferably said first and, also preferably, said second guide means comprise guide elements in the form of rollers which are held at fixed positions in relation to the shaping shoulder.

Preferably also, the second guide means comprises successive said guide elements for progressively locating said reclosable profile elements in said respective opposing positions.

In accordance with a preferred aspect of the invention for making the tubular intermediate plastics product from a substrate material in sheet form with said reclosable elements secured thereto, there are provided means for feeding said sheet material and said reclosable elements between respective pinch and guide rollers and applying an adhesive to one or both of said reclosable elements and said substrate prior to passage through said pinch rollers and preferably said pinch rollers are located at a distance apart which is equivalent to said fixed distance apart.

In a preferred aspect of the apparatus of the invention for the manufacture of said tubular intermediate plastics product from independent substrate and reclosable elements, there is provided an accumulator device between said pinch rollers and said forming shoulder.

In accordance with further preferred aspects of the apparatus of the present invention, the apparatus defined in one or more of the preceding paragraphs is combined with transverse sealing and/or cutting means located downstream of said shaping shoulder and, preferably also, longitudinal welding means for sealing together the adjacent longitudinal edges of the tubular form, said further sealing elements being located between said shaping shoulder and said transverse sealing means.

BRIEF DESCRIPTION OF THE DRAWINGS

Further aspects, details and advantages of the invention will become apparent from the following description taken in conjunction with the accompanying drawings in which.

DESCRIPTION OF PREFERRED EMBODIMENTS

Figure 1:
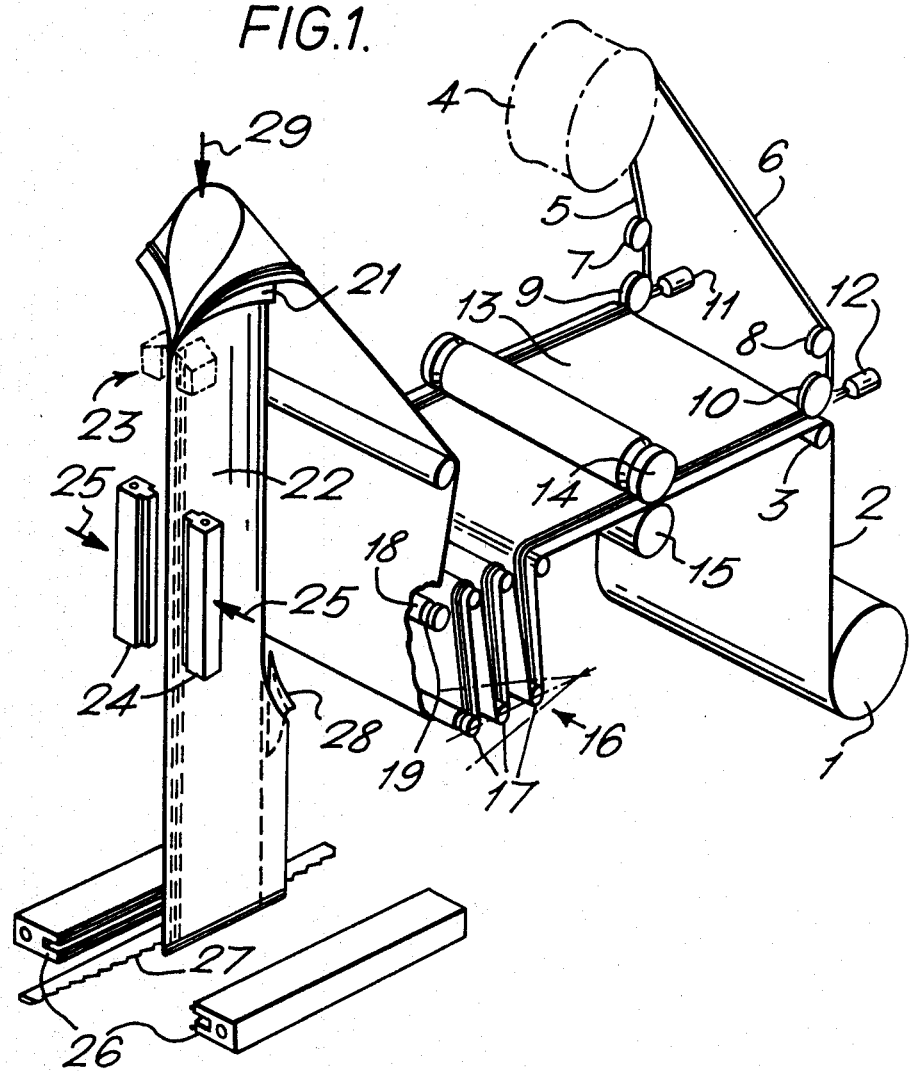
FIG. 1 is a schematic perspective view of apparatus for making articles in the form of reclosable bags containing a product material from a laminated substrate and independent reclosable elements.

The bag/article forming apparatus of FIG. 1 comprises a feed roll 1 of a plastic laminated substrate sheet material 2 which supplies the material through to a plain supporting roller 3. Located above the plain roller 3 is a supply roll 4 of the two closure elements (male 5 and female 6) of the reclosable elements of the eventual bag/articles. The elements 5 and 6 are passed over grooved guide rollers 7, 8 to grooved pressure rollers 9, 10 which form pinch rollers with the supporting roller 3. Adhesive is applied to the flat surface of the reclosable elements 5 and 6 through nozzles 11 and 12 respectively. Passage of the reclosable elements between the grooved rollers 9 and 10 and the plain roller 3 together with the substrate 2 results, on application of the adhesive, in a permanent bag forming material assembly 13 which passes between assembly-guiding and advancing means comprising drive rollers 14 and 15 to an accumulator 16 in the form of a plurality of dancing rollers. The upper roll 14 of the drive rollers 14, 15 is grooved adjacent its ends so as to provide a fixed spacing for the profile elements 5 and 6 on the substrate 2. This spacing corresponds to the spacing between the pinch rollers 9 and 10 and also to the spacing of grooves on the lower ones 17 of the dancing rollers, namely those rollers which can be moved with respect to the upper rollers to provide the variable accumulation facility of the accumulator 16.

The sheet material 13 is supplied from the accumulator 16 by way of a guide roll 18 provided with guide elements in the form of grooves 19 at the same spacing as those of roller 14 and a plain roller 20 upwardly to a shaping shoulder 21. The sheet material 13 is passed around the shaping shoulder 21 and then downwardly as a tubular form intermediate product 22. Second guide means 23 are provided which include means for locating the male and female reclosable elements 5 and 6 in opposing positions therein and for causing the elements 5 and 6 to enter into cooperative engagement.

Below the guide means 23 there is provided a pair of vertical sealing bars 24 which are movable with respect to each other in the direction of arrows 25 to seal the open lip of the tubular intermediate product 22 which is formed by the adjacent edges of the substrate 2. In the finished article this sealing provides a pilfer proof closure to the finished article. Further downstream of the sealing bars 24 there is provided means 28 for forming a gusset in the side or edge of the tubular form which is remote from the edge which has been sealed by the sealing bars 24. Still further downstream of the gusset forming device 28 there is provided a pair of transverse sealing bars 26 together with a cutting tool 27. The elements 26 and 27 are arranged to be moved in a reciprocating manner vertically as well as to be moved towards and away from each other. From an initial raised position, the bars 26 are moved towards each other to place a transverse seal on the tubular form and while this seal is being made the bars 26 are moved vertically downwardly drawing the tubular form over the shaping shoulder 21 from the accumulator 16 against the weight of the lower rollers 17. During the downward movement of the bar 26 the cutter bar 27 is moved across to divide one article from the tubular form. When the bars 26 have reached the bottom of their downward movement they are opened and bar 27 is retracted and the assembly is moved upwardly again. During the upward movement of the bars 27 the vertical sealing bars 24 are operated to create the sealing lip. The accumulator is sized to accept a continuous supply of the bag forming material 13 feeding into the accumulator 16 from the supply rolls 4 and the drive rollers 14, 15 during the intermittent pulling of the material to the shoulder 21 in the dwell and advance cyclical downward movement of the tubular form 22.

A product can be delivered into the top of the tubular form in the direction of the arrow 29 during the upward movement of the bars 26 so that on the next sealing operation of the sealing bars 26 an article comprising a bag and a product material is formed.

Figure 2:
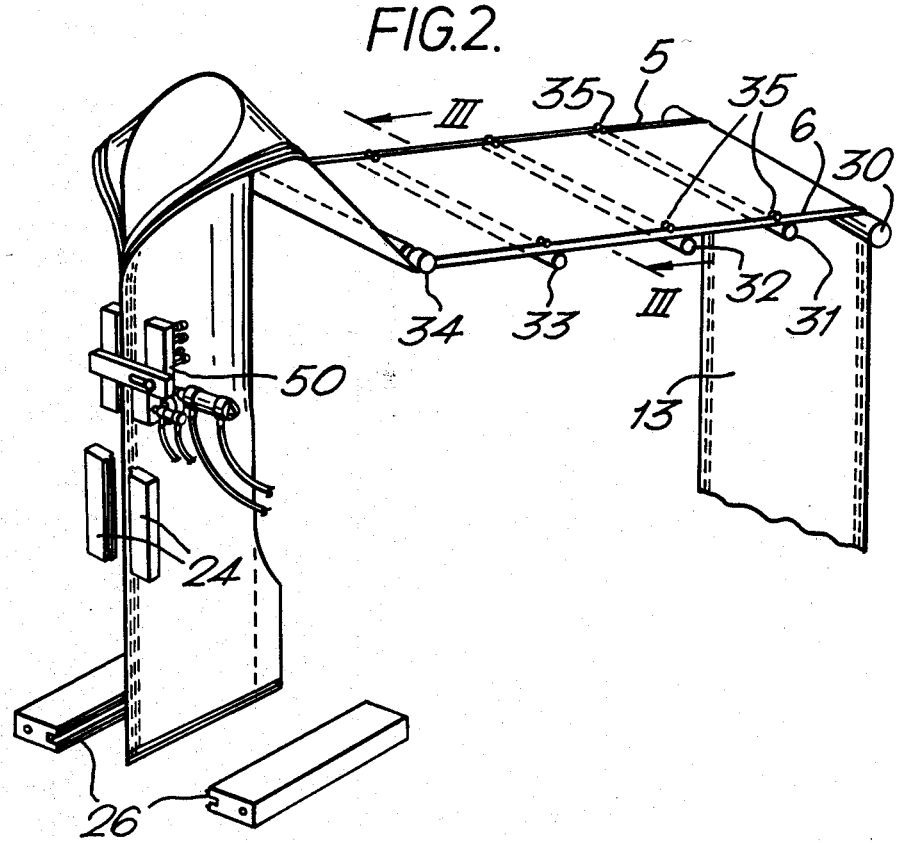
FIG. 2 is a further schematic perspective view of part of a modified form of the apparatus of FIG. 1.

In FIG. 2 there is illustrated a modified form of the apparatus of FIG. 1.

The bag forming material 13 is drawn upwardly from an accumulator such as accumulator 16 of FIG. 1 and then over a plain roller 30. The substrate material then travels horizontally over three plain rollers 31, 32, 33 towards a shaping shoulder which is not shown in FIG. 2. Forming pinch rollers with the rollers 31, 32, 33 are discrete pairs 35 of rollers. There are two pairs 35 of rollers associated with each of the plain rollers 31 32, 33 and the associated pairs are spaced apart by a fixed distance so that the reclosable elements 5 and 6 travel in parallel paths towards the shaping shoulder. The spacing of the two pairs of rollers 35 is preferably equivalent to that of the spacing of the grooved rollers 9 and 10. Each roller pair comprises two roller bearings mounted on a shaft and spaced from each other by a distance corresponding to the width of the cooperating portion of the corresponding male or female element.

From the last of the plain rollers 33 the bag forming material 13 passes to a single grooved roller 34 (the grooves being at the common spacing of the associated ones of roller pairs 35) and from there over the shaping shoulder towards second guide means which are illustrated generally at 50 and will be described in detail with reference to FIGS. 4 and 5 below. Vertical sealing bars 24 and horizontal sealing bars 26 and a cutting bar (not shown) are provided in the same manner as in the apparatus described with reference to FIG. 1.

Figure 3:
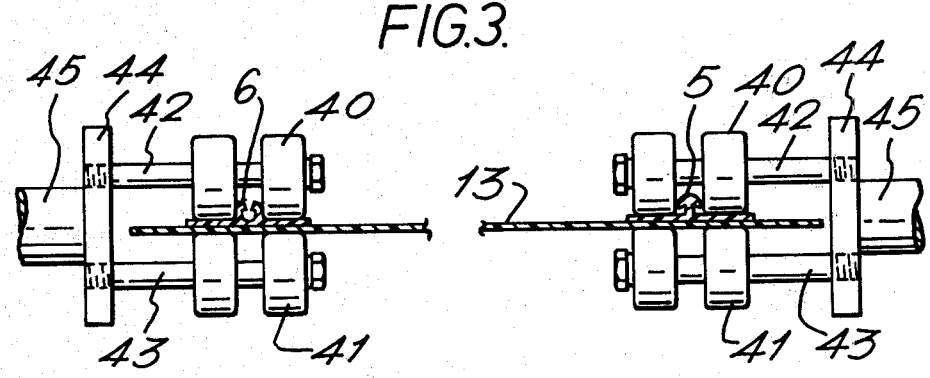
FIG. 3 is a view on line III—III of FIG. 2 of a modified form of guide means for use with the apparatus of FIG. 2.

In FIG. 3 there is shown a modification of the guide rollers lying between the roller 30 and the roller 34 of the apparatus shown in FIG. 2.

In FIG. 3 the guide means on each side of the sheet material 13 comprise pairs 40 and 41 of roller bearings arranged above and below the material 13. The upper and lower pairs 40,41 of rollers are each located on respective shafts 42,43 which are connected to a support plate 44 which is in turn mounted on a support rod 45 which is for securing to the main frame. The support rods 42, 43 are screw-threadedly received in the mounting plate 44 so that the spacing of the individual roller pairs 40, 41 with respect of the mounting plate 44 in the main frame can be adjusted during setting up of the machine. The individual ones of the roller pairs 40 and 41 are mounted in a spaced apart manner on their respective support rods 42, 43 at a distance sufficient to allow the male or female elements to pass therebetween. The upper and lower ones of the upper and lower roller pairs are associated with each other so as to constrain the reclosable elements 5 and 6 to move in a precise path and for the substrate to move with the reclosable elements.

Figure 4:
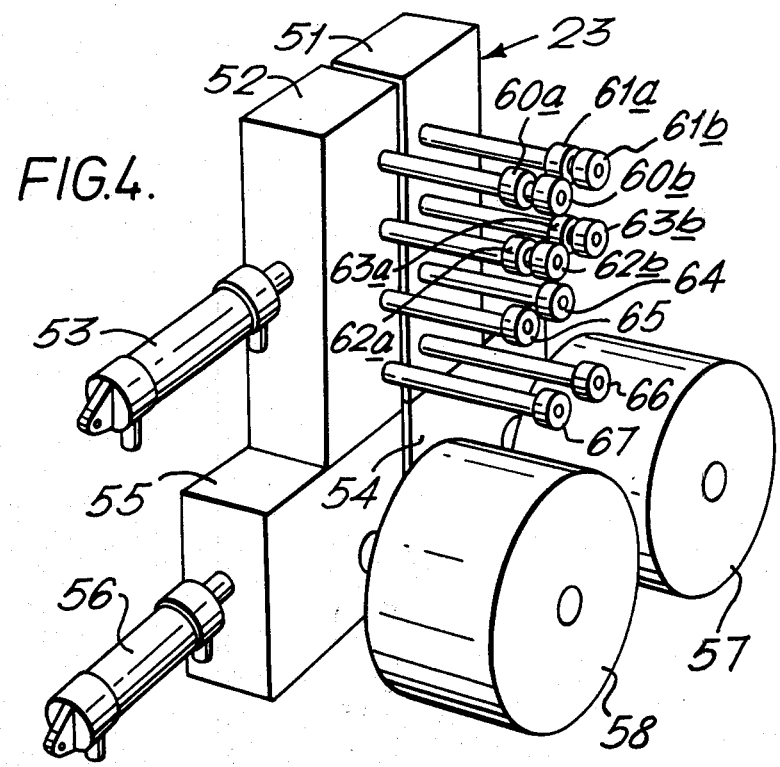
FIG. 4 is an enlarged perspective view of the guide means downstream of the shaping shoulder of the apparatus of FIG. 2.
Figure 5:
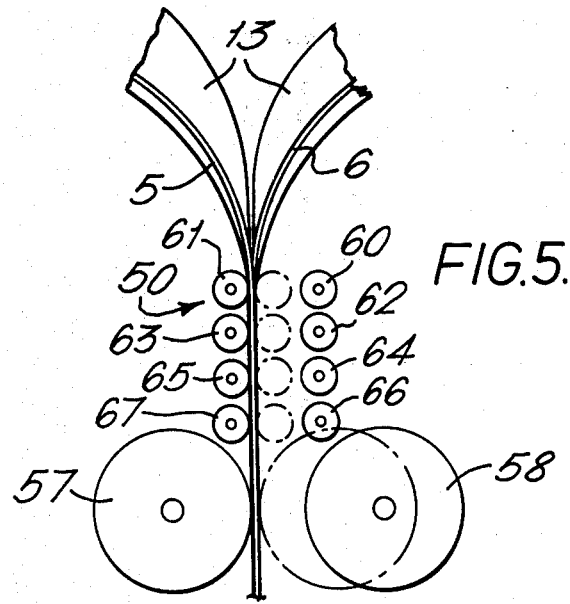
FIG. 5 is a schematic elevation of the guide means of FIG. 4.

Turning now to the formation of the guide means 23 located downstream of the forming shoulder 21 which are illustrated in FIGS. 4 and 5, there are provided support blocks 51 and 52 for a plurality of guide elements. The support block 51 is rigidly mounted in the frame and the support block 52 is movable towards and away from the support block 51 by way of a piston and cylinder assembly 53 which has its piston attached to the block 52 and its cylinder atached to the frame. Located downstream of the blocks 51 and 52 are further blocks 54 and 55 of which the block 54 is rigidly attached to the frame and the block 55 is movable by a piston and cylinder assembly 56, whose cylinder is attached to the frame and whose piston rod is attached to the block 55, towards and away from the block 54.

The support blocks 54 and 55 rotatably carry respective plain rollers 57 and 58 which are arranged so that in use of the apparatus the male and female elements 5, 6 passing therebetween in the correct opposed relationship are caused to move into cooperative interengagement. The support blocks 51 and 52 carry respective roller pair arrangements which are disposed along the path of movement of the closure elements 5 and 6 so as to guide these progressively into the correct opposing relationship for their final interengagement by way of the rollers 57 and 58. Although the rollers mounted on the blocks 51 and 52 act on the rear or smooth, flat face of the bag forming material 13 they are effective to position the reclosable elements because the material tends to deform slightly so as to provide a bump on which the roller elements are effective to constrain the movement of the reclosable elements themselves. As is clearly shown in FIG. 5 the guide elements are arranged in respective pairs. A first pair of guide elements 60, 61 are each formed of respective pairs of rollers 60a, 60b and 61a, 61b and form first prealignment guide elements. Downstream thereof there are second roller elements 62, 63 which are also in the form of roller pairs 62a and 62b and 63a and 63b. The roller elements 62 and 63 form second prealignment guide elements and like the roller elements 60, 61 act on both sides of the respective male and female elements. Still further downstream there are front final alignment guides 64,65 each comprising a single roller and these act on the profile closure element side which is closest to the open lip of the tubular form. And finally immediately before the closure rollers 57,58 are rear final alignment guides 66,67 which again are single roller elements. All the roller elements can be moved towards and away from the respective support blocks 51 and 52 independently of each other so that, in the setting up of the apparatus, the exact positioning of these guides can be established to ensure the successful closure of the closure elements as they pass through the rollers 57 and 58.

It is to be noted at this point that during operation of the machine the roller elements 60 to 67 as well as all the roller elements of the first guide elements 31 to 35 of FIG. 2 are maintained in fixed relationship to each other and to the shaping shoulder 21.

Figure 6:
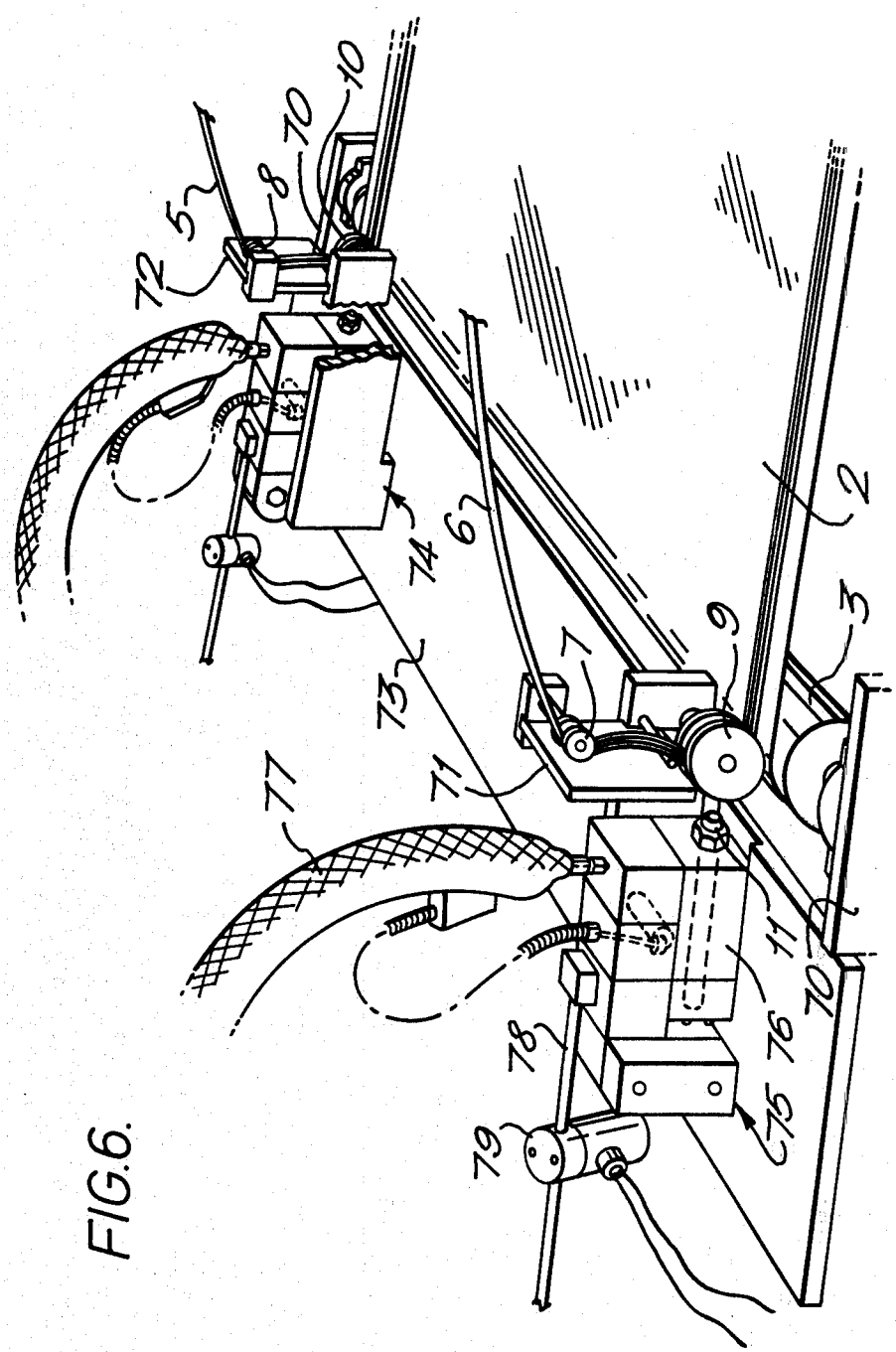
FIG. 6 is a perspective schematic and more detailed view from the opposite direction of part of the apparatus of FIG. 1 for applying the reclosable elements to a flat substrate.

The apparatus shown in FIG. 1 of the drawings is intended to form bag forming material from separate supply rolls of a laminated substrate 2 and male and female closure elements 5 and 6. FIG. 6 of the drawings shows in more detail the arrangement for securing the reclosable profile elements 5 and 6 to the substrate 2.

The supporting roller 3 is rotatably supported in bearings mounted on support plates 70 of the machine. The guide and pinch rollers 7, 8 and 9, 10 are supported on respective mounting plates 71, 72 of the supporting frame of the machine. The rollers 7, 8 and 9, 10 can be constructed as roller bearing guides in the same manner as the rollers 35 and 60 to 67 of the guide means already described with relation to FIGS. 3, 4 and 5. Again there is provision for adjusting the spacing of the rollers 7 and 8 and rollers 9 and 10 to ensure the constant guidance of the profile elements 5 and 6 along the defined parallel paths leading to the final guide roller prior to the shaping shoulder 21.

A main bearing plate 73 extends parallel to the roller 3 across the rear of the machine and the bearing plate 73 supports two adhesive spraying arrangements 74 and 75 which are of basically the same construction and only the arrangement 75 will be described in any detail.

The adhesive supply device 75 contains a main block 76 which has an outlet nozzle 11 directed towards the plane or flat surface of the profile reclosable element 6 passing over the roller 9. A supply of adhesive is passed into the main block 76 through a heated flexible hose 77 and air is supplied along a pipe 78 which is controlled by an air solenoid 79. Suitable heating means and controls are provided within the block 76 and elsewhere in order to ensure that the adhesive is maintained at the correct temperature for successful application to the closure element 6.

The operation of the apparatus as described above will have become apparent from the description thereof but, in summary, a laminated substrate 2 is supplied from a supply roll 1 into the nip between the grooved rollers 9, 10 and the supporting roller 3 along with the male and female elements 5, 6 from a supply roll 4 and adhesive is supplied onto the plane surfaces of the male and female elements from nozzles 11 and 12. The material passing from the nip rollers as pulled therethrough and uninterruptedly advanced by the rollers 14, 15 is a bag forming material 13 and this is drawn into the accumulator 16 by the effect of the weight of the dancing rollers 17 of the accumulator. Heat sealing bars 26 located well downstream from the shaping shoulder 21 reciprocate intermittently to draw the bag forming material 13 in from the accumulator and over a grooved guide roll 18 and a plane guide roll 20 (in the case of the apparatus of FIG. 1 and corresponding rollers 30 and 34 in the case of the apparatus of FIG. 2) to the shaping shoulder 21. The first guide means associated with these rollers ensure that the male and female elements maintain a constant position with respect to the shaping shoulder 21. As the tubular formed material 22 is drawn from the shaping shoulder 21 the second guide means 23 illustrated in detail in FIGS. 4 and 5 are effective to ensure that the reclosable elements 5 and 6 are correctly positioned and then closed by way of the final closing rollers 57, 58. The double acting piston and cylinder units 53 and 56 are caused to move the roller pairs of the guide means 23 towards each other as the machine comes into operation and to hold these roller elements in their correct position during subsequent operation. They are operated to move the roller elements apart during a non-productive phase of the working of the apparatus. As the tubular intermediate product 22 is drawn downwardly by the heating bars 26 a gusset is formed by the gusset forming means 28 and a cutting bar 27 is operated to sever individual bags or articles containing a product which has been supplied into the access opening at the top of the tubular product 22 in the direction of arrow 29. During the return movement of the sealing bars 26 the vertical sealing bars 24 are operated in the direction of arrows 25 and 26 in order to provide a pilfer proof closure to the bags by sealing the free edges of the bags lying adjacent to each other next to the closure elements 5 and 6.

I claim:

1. A method including the steps of making and shaping a permanent assembly of bag making plastic sheet and separable and reclosable fastener strip into vertical upwardly opening tubular form adapted for gravitationally receiving bag filling contents in vertical form/fill/seal packaging; and the successive steps of sealing lower end portions of the vertical tube into bag sections, effecting cyclical dwell and intermittent downward advancing of the tube by bag sections and severing the bag sections from the lower end of the tube; the improvement consisting in supplying the bag making assembly to said tube forming step from a location adjacent to the location of said tube forming step, and comprising the steps of:

providing continuous length bag sheet material from a supply means;

providing continuous length separable fastener strip from a supply means;

continuously effecting joinder and securement of said sheet material and said fastener strip as derived from said supply means into a permanent assembly;

at a location downstream from said joinder and securement step uninterruptedly advancing said assembly toward said shaping step, while said successive steps of tube sealing, severing and cyclical dwell and intermittent advancing of the tube continue progressively;

and at a location intermediate said assembly advancing step and said tube shaping step, accumulating the uninterruptedly advancing assembly to compensate for dwells in the intermittent advance of the tube.

2. A method according to claim 1, which comprises running said sheet and fastener strip through the nip of pinch roll means for effecting said joinder, and in advance of the nip applying adhesive between the sheet and strip.

3. A method according to claim 2, which comprises running and guiding the fastener strip over guide roller means adjacently in advance of said pinch roll means.

4. A method according to claim 1, 2 or 3, comprising effecting said assembly and advancing step in the nip of drive rolls, and guiding the assembly by engaging said fastener strip in guide groove means in one of said drive rolls.

5. A method according to claim 1, 2 or 3, comprising effecting said accumulating step in an accumulator having rollers over which the assembly is drawn, and effecting guiding of the assembly through the accumulator by running the fastener strip through guide grooves in certain of said accumulator rollers.

6. A method according to claim 1, 2 or 3, comprising at a location intermediate the length of said tube forming a longitudinal gusset in said tube.

7. A method according to claim 1, 2 or 3, which comprises drawing the plastic sheet from a prefabricated supply means wound roll of the plastic sheet to said joinder and securement step, and drawing the separable fastener strip from a prefabricated wound roll in the strip means to said joinder and securement step.

8. A method according to claim 1, 2 or 3, comprising joining and securing said fastener strip as separate male and female plastic profile strips respectively to opposite margins of said plastic sheet, and effecting fastener closure of the strip profiles during shaping of the tubular form.

9. A method according to claim 1, 2 or 3, comprising joining and securing said fastener strip to said sheet in the form of separated male and female complementary plastic profiles, and during shaping of said tube running said profiles through a series of guiding and pressure rollers and thereby joining said profiles into closed fastener relation.

10. In apparatus including tube forming means for making and shaping a permanent assembly of bag making plastic sheet and separable and reclosable fastener strip into vertical upwardly opening tubular form adapted for gravitationally receiving bag filling contents in a vertical in a form/fill/seal packaging machine; and means operative for successively sealing lower end portions of the tube into bag sections, and for effecting cyclical dwell and intermittent downward advancing of the tube by bag sections and for severing the bag sections from the lower end of the tube; the improvement consisting in means located adjacent to said tube forming means for supplying the bag making assembly to said tube forming means, and comprising:
 supply means for continuous length plastic sheet;
 supply means for continuous length separable fastener strip;
 means adapted for continuously effecting joinder and securement of said sheet and said fastener strip as derived from said supply means into a permanent assembly;
 assembly guiding and advancing means located downstream from said joinder and securement means for uninterruptedly advancing said assembly toward said shaping means, and thereby uninterruptedly pulling said film and said fastener strip through said joinder and securement means, while said tube sealing, advancing and severing means intermittently cyclically advances said tube;
 and means located intermediate said assembly guiding and advancing means and said tube making and shaping means for accumulating the uninterruptedly advancing assembly during dwells in the intermittent advance of said tube.

11. Apparatus according to claim 10, wherein said means adapted for continuously effecting joinder and securement comprises pinch rolls through the nip of which the sheet and fastener strip are caused to run by said uninterrupted pulling effected by said assembly guiding and advancing means, and means located in advance of said nip for applying adhesive between the sheet and strip.

12. Apparatus according to claim 11, including guide roller means adjacently in advance of said pinch roll means over which said fastener strip is guided toward said pinch roll means.

13. Apparatus according to claim 10, 11 or 12, wherein said assembly guiding and advancing means comprises drive rolls nipping said assembly, and one of said drive rolls having fastener strip guide groove means for thereby guiding the assembly by engagement of said fastener strip in said groove means.

14. Apparatus according to claim 10, 11 or 12, wherein said accumulating means comprises an accumulator having rollers over which the assembly is drawn, and means for guiding the assembly through the accumulator comprising guide grooves in certain of said accumulator rollers through which the fastener strip is caused to run.

15. Apparatus according to claim 10, 11 or 12, comprising means at a location intermediate the length of said tube for forming a longitudinal gusset in said tube.

16. Apparatus according to claim 10, 11 or 12, wherein said plastic sheet is in the form of a prefabricated wound roll in said plastic sheet supply means and from which wound roll the sheet is drawn to said joinder and securement means, and said fastener strip is drawn from a prefabricated wound roll of the strip in said strip supply means to said joinder and securement means.

17. Apparatus according to claim 10, 11 or 12, wherein said fastener strip comprises separate male and female plastic profile strips and said joinder and securement means being operative to join and secure the separate strips respectively to opposite margins of said plastic sheet, and means for effecting fastener closure of the strip profiles during shaping of the tubular form.

18. Apparatus according to claim 10, 11 or 12, wherein said fastener strip comprises separated male and female complementary plastic profiles, and means operative in the shaping of the tubular form comprising a series of guiding and pressure rollers operative to join said profiles into closed fastener relation.

19. Apparatus according to claim 10, 11 or 12, wherein said fastener strip comprises separated male and female complementary plastic profiles, means operative in the shaping of the tubular form comprising a series of guiding and pressure rollers operative to join said profiles into closed fastener relation, and means mounting said rollers for separation and closing toward one another for facilitating feeding of the fastener profile carrying portion of the assembly through the series of rollers, and said rollers being adjustable relative to said mounting means.

* * * * *